United States Patent
Malric et al.

(10) Patent No.: US 6,596,197 B2
(45) Date of Patent: Jul. 22, 2003

(54) POTASSIUM MONOFLUOROPHOSPHATE AS A CORROSION INHIBITOR

(75) Inventors: Bernard Malric, Divonne les Bains (FR); Theophil Lutz, Morges (CH)

(73) Assignee: Domtar Inc., Quebec (CA)

( * ) Notice: Subject to any disclaimer, the term of this patent is extended or adjusted under 35 U.S.C. 154(b) by 144 days.

(21) Appl. No.: 10/188,561

(22) Filed: Jul. 1, 2002

(65) Prior Publication Data

US 2002/0166996 A1 Nov. 14, 2002

Related U.S. Application Data

(63) Continuation of application No. PCT/CA00/00070, filed on Jan. 26, 2000.

(51) Int. Cl.⁷ .............................................. C04B 22/16
(52) U.S. Cl. ................................... 252/387; 106/14.12
(58) Field of Search ....................... 252/387; 106/14.12

(56) References Cited

U.S. PATENT DOCUMENTS

| | | | | |
|---|---|---|---|---|
| 4,132,572 A | * | 1/1979 | Parant et al. | ............. 106/14.12 |
| 4,153,478 A | | 5/1979 | Parent et al. | |
| 4,613,450 A | | 9/1986 | Moran et al. | |
| 5,071,579 A | | 12/1991 | Johnston et al. | |
| 5,092,923 A | * | 3/1992 | Dillard et al. | ............. 106/14.05 |

FOREIGN PATENT DOCUMENTS

| WO | WO 92/14796 | | 9/1992 | |
|---|---|---|---|---|
| WO | WO 01/55052 A | * | 2/2001 | ........... C04B/22/16 |

* cited by examiner

*Primary Examiner*—Margaret Medley
(74) *Attorney, Agent, or Firm*—Bachman & LaPointe, P.C.

(57) ABSTRACT

Potassium monofluorophosphate is found to be superior to sodium monofluorophosphate as a corrosion inhibitor for steel reinforcement members in reinforced concrete; conveniently the potassium monofluorophosphate in aqueous solution is contacted with a surface of the reinforced concrete to facilitate penetration of the potassium monofluorophosphate into the concrete.

9 Claims, 3 Drawing Sheets

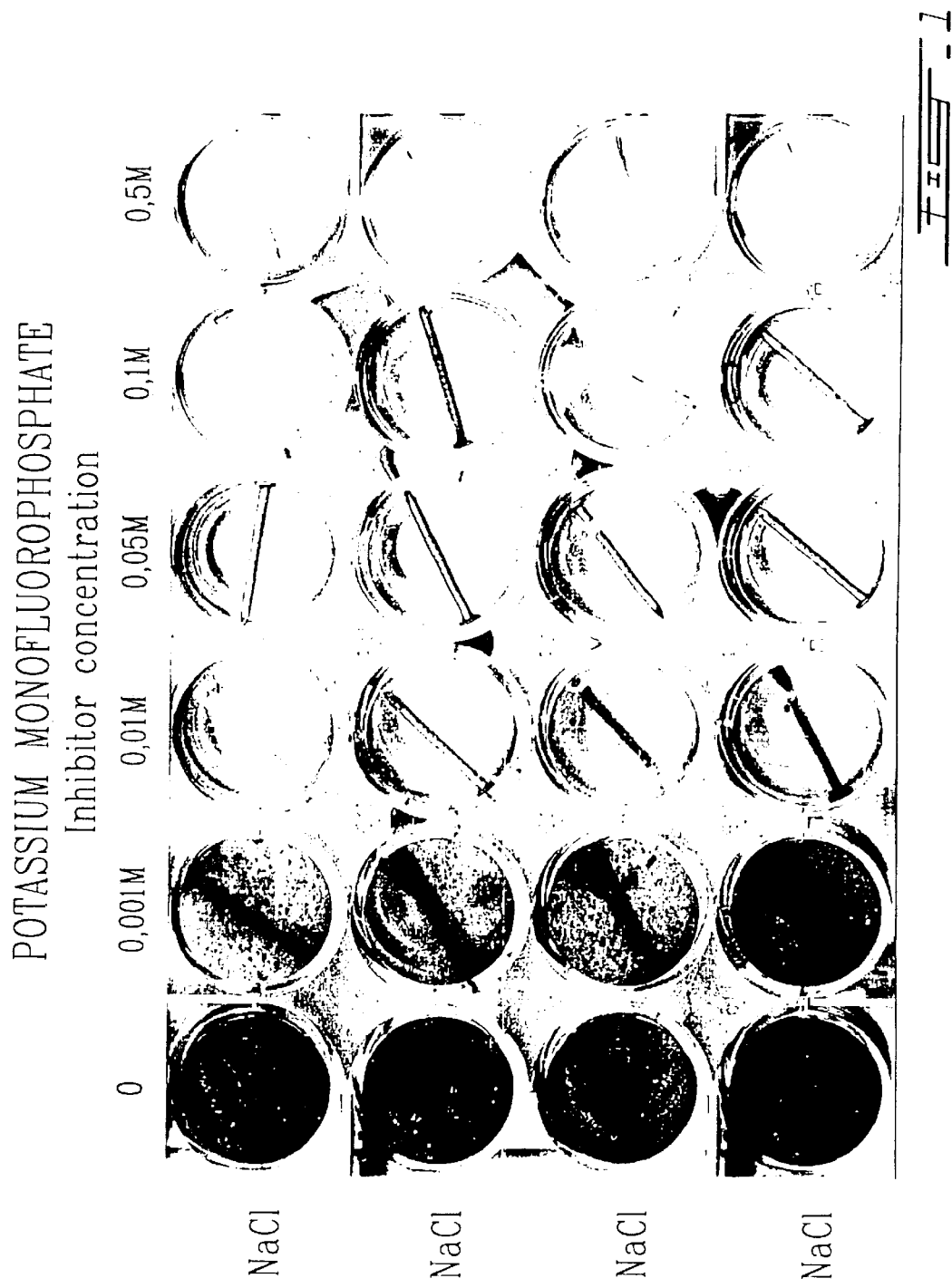

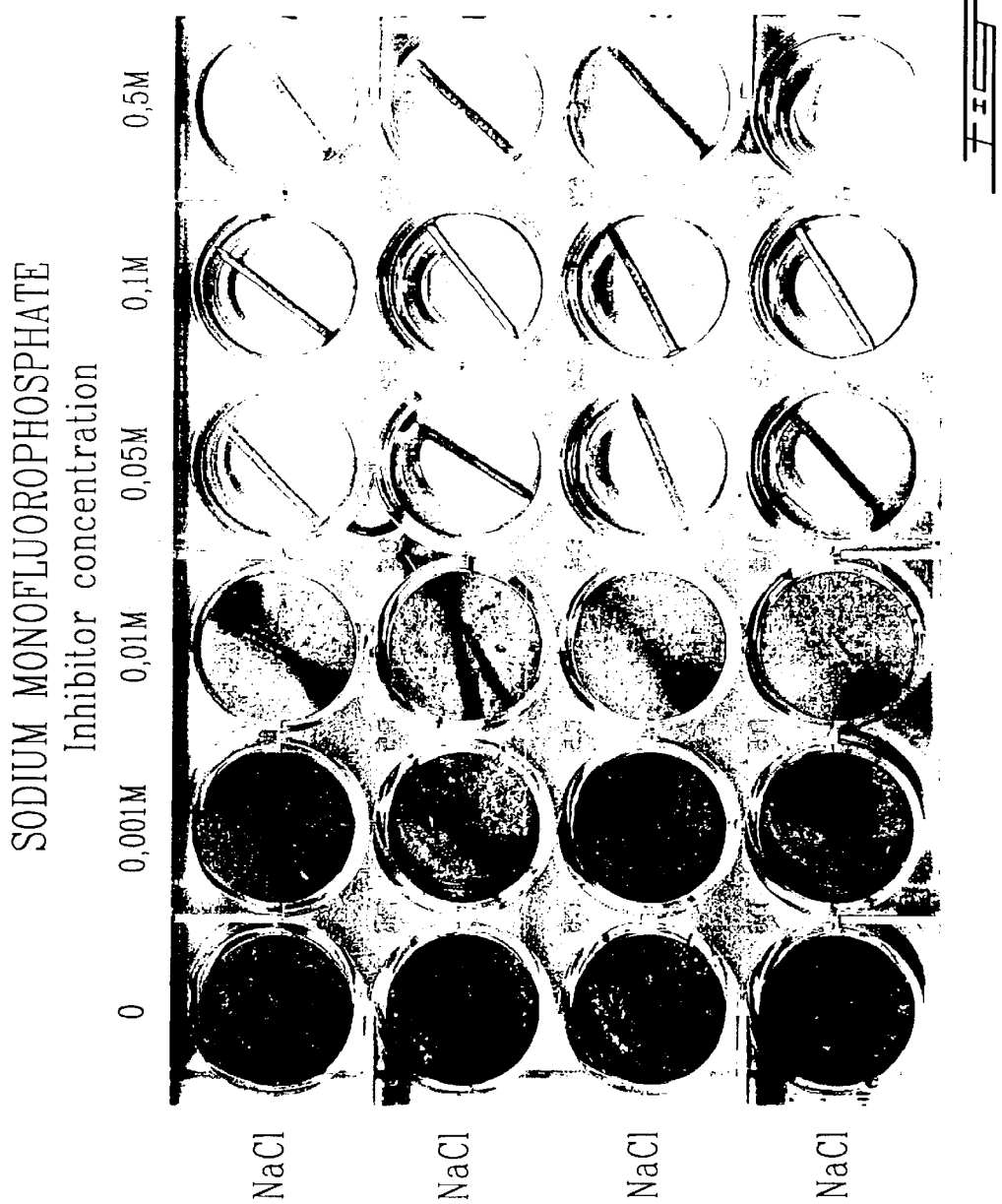

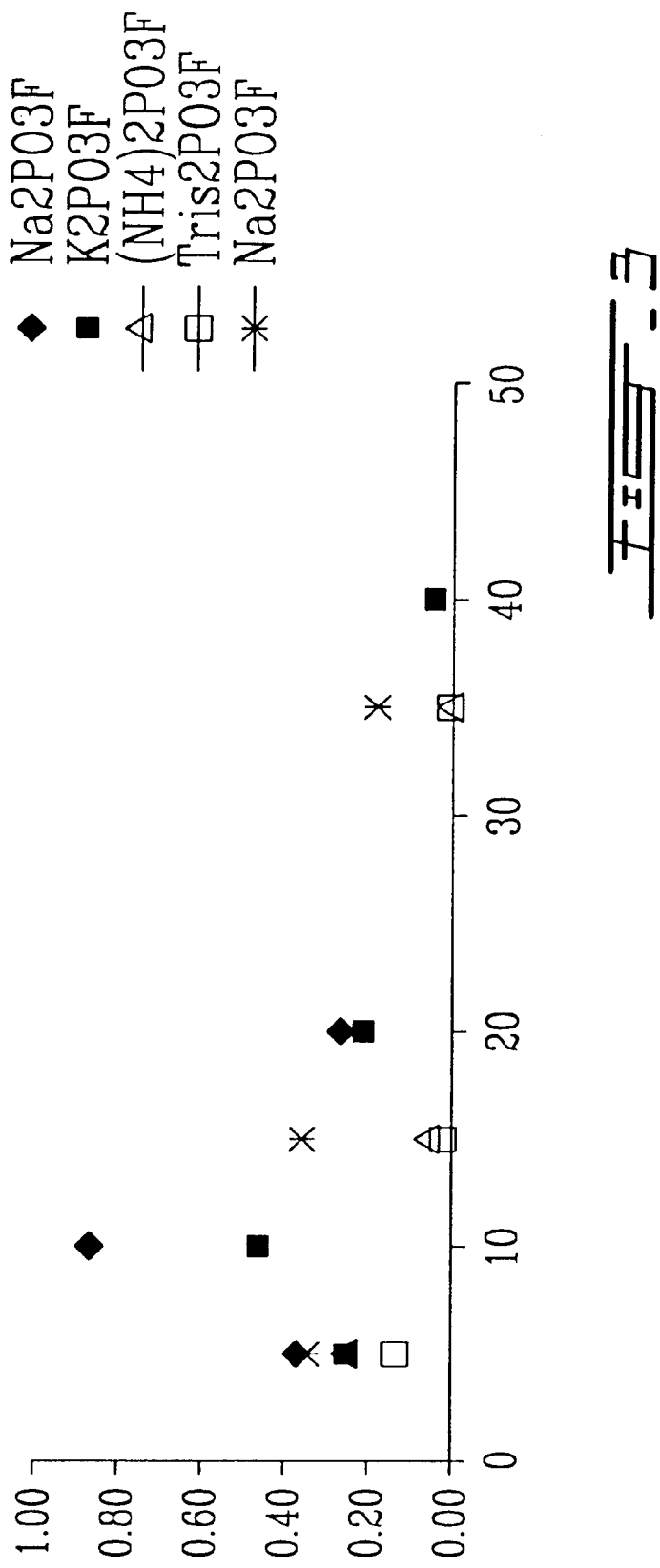

POTASSIUM MONOFLUOROPHOSPHATE AS A CORROSION INHIBITOR

This application is a Continuation of PCT/CA00/00070 filed Jan. 26, 2000, in which the United States of America was designated and elected, and which remains pending in the International Phase until Jul. 26, 2002.

BACKGROUND OF THE INVENTION i) Field of the Invention

This invention relates to a method of inhibiting corrosion of steel reinforcing members in concrete and to a treated reinforced concrete.

ii) Description of Prior Art

BACKGROUND ART

U.S. Pat. No. 5,071,579, issued Dec. 10, 1991, of Domtar Inc., describes the use of sodium fluorophosphate, also known as "sodium monofluorophosphate" and abbreviated as "MFP", to prevent corrosion of reinforced concrete containing steel rebars when such concrete is exposed to a corrosive environment, for example, chloride ions.

Carbonation of concrete results from penetration of carbon dioxide from the air into the concrete and reaction of the carbon dioxide with hydroxides such as calcium hydroxide in the concrete. Carbonation lowers the alkalinity of the concrete. High alkalinity is needed to protect embedded steel rebars from corrosion.

As described in the US patent establishment of galvanic corrosion cells at the steel rebars results in corrosion of the steel, with creation of expansive forces which destroy the concrete.

Concrete is used in the construction of buildings and in the manufacture of articles including paving slabs, structural members, curbing, gutters, pipes and other cast articles.

WO 92/14796 published Sept. 3, 1992, Domtar Inc., describes the use of the aforementioned sodium fluorophosphate to reduce scaling due to freezing and thawing of concrete, particularly when a deicer such as sodium chloride is used to deice the surface of the concrete.

The present invention seeks to provide improvements in the inhibition of corrosion of steel reinforcing members in concrete and an improved treated concrete, employing potassium monofluorophosphate in place of or in combination with sodium monofluorophosphate.

SUMMARY OF THE INVENTION

In accordance with one aspect of the invention there is provided a method of inhibiting corrosion in a reinforced concrete containing steel reinforcing members comprising contacting the reinforced concrete with potassium monofluorophosphate.

In accordance with another aspect of the invention there is provided a reinforced concrete containing steel reinforcing members and having a concrete surface, said concrete containing potassium monofluorophosphate.

DESCRIPTION OF PREFERRED EMBODIMENTS i) Application of Potassium Monofluorophosphate Suitably an aqueous solution of the potassium monofluorophosphate is contacted with the concrete. In particular, the aqueous solution is contacted with a surface of the reinforced concrete such that the solution containing dissolved potassium monofluorophosphate penetrates into the concrete and deposits the potassium monofluorophosphate in a penetration zone extending inwardly into the concrete, from the concrete surface, and from which the potassium monofluorophosphate migrates to the steel reinforcing members.

By "penetration zone" is to be understood a depth of the concrete, determined from the concrete surface which is contacted with the solution within which the solution of potassium monofluorophosphate penetrates, and which extends towards the steel reinforcing members, for example, steel rebars.

It will be understood that additives for other purposes may be present in the aqueous solution, but the solution should be free of chemicals that promote corrosion or that would otherwise detract from the objective of inhibiting corrosion.

It will be recognized that the potassium monofluorophosphate could be contacted with the concrete surface in solution in other vehicles for example, organic solvents, without departing from the spirit of the invention. However, from a practicable standpoint an aqueous vehicle is by far preferred.

Conveniently the aqueous solution employed in the invention may contain up to 35%, by weight, and typically 5 to 20%, by weight, of the potassium monofluorophosphate.

The solution may be contacted with the concrete by various methods depending on the form of the concrete article or structure which is to be treated. By way of example, the aqueous solution of potassium monofluorophosphate may be sprayed, painted, brushed or otherwise applied as a coating on an exposed concrete surface. The solution should be applied in an amount to achieve a desired penetration into the concrete to reach the steel rebar reinforcing members.

The concrete may also be soaked in the solution, for which purpose a dike may be built around the concrete to retain the solution during a soaking period.

The invention is not restricted to application by means of a solution of the potassium monofluorophosphate and the latter may be applied in a powder form to the concrete surface, or in a gel.

The potassium monofluorophosphate should penetrate the reinforced concrete to reach the steel rebars which are the reinforcing members in the concrete. Typically the rebars are disposed at up to 35 mm from the concrete surfaces in buildings, and at up to 60 mm in highway structures. At these locations corrosion of the rebars is a problem.

It is especially advantageous to apply the potassium monofluorophosphate when the reinforced concrete is in a substantially dry state, in which state the capillary passages in the concrete are open for migration of the potassium monofluorophosphate into the concrete.

ii) Corrosion Inhibition

It has surprisingly been found that not only is potassium monofluorophosphate a corrosion inhibitor for reinforced concrete, but also that it is markedly superior to sodium fluorophosphate in providing such corrosion inhibition.

It was not previously known and was not predictable that potassium monofluorophosphate would function as a corrosion inhibitor for reinforced concrete, and still less was it predictable that it would be superior to the known corrosion inhibitor sodium fluorophosphate.

In order to function as an effective corrosion inhibitor a chemical needs to be an efficient corrosion inhibitor in both alkaline and neutral environments, corresponding to non-carbonated reinforced concretes polluted by chlorides, as well as carbonated reinforced concretes.

The chemical needs to be sufficiently stable and for most forms of application, sufficiently soluble in a suitable vehicle, for example, water, to obtain a concentration of the chemical effective for introduction of an effective corrosion inhibiting amount of the chemical into the concrete.

The chemical needs migration or penetrating characteristics such that a useful and adequate penetration of the chemical into the reinforced concrete can be achieved; and, in particular, should be capable of migrating along a network of concrete pores and capillaries to reach the steel rebar reinforcing members of the concrete, which are subject to corrosion.

Most desirably a chemical, in order to function as an effective corrosion inhibitor should provide corrosion inhibition to the steel rebars, in low concentrations of the chemical.

While sodium fluorophosphate has previously been identified as an effective corrosion inhibitor for the steel reinforcing members of reinforced concrete other fluorophosphates do not provide such corrosion inhibition; by way of example, lithium monofluorophosphate, ammonium monofluorophosphate, calcium fluorophosphate and strontium fluorophosphate have been evaluated and do not function as corrosion inhibitors for the steel reinforcement members in reinforced concrete. Even when the monofluorophosphates such as ammonium monofluorophosphate have a necessary solubility in water to permit their application to concrete, it is found that an effective penetration or migration of the monofluorophosphate into the concrete does not occur.

The solubility of the fluorophosphate varies over a wide spectrum, additionally while the fluorophosphate anion plays a role in corrosion inhibition it appears that the accompanying cation also has a significant role both with respect to the corrosion inhibiting capacity of the compound and the ability of the fluorophosphate compound to migrate or diffuse into the concrete, through a network of pores and capillaries.

In the present invention it has been found not only that potassium monofluorophosphate functions as an effective corrosion inhibitor for the steel reinforcing members of reinforced, whereas the related lithium, ammonium, tris, calcium and strontium monofluorophosphate do not; but also that potassium monofluorophosphate is markedly superior to sodium monofluorophosphate as a corrosion inhibitor.

In particular potassium monofluorophosphate is found to be up to five times more effective than sodium monofluorophosphate. Typically potassium monofluorophosphate provides the same level of corrosion inhibition as sodium monofluorophosphate when employed in an amount of one-fifth the amount of sodium monofluorophosphate.

BRIEF DESCRIPTION OF DRAWINGS

The invention and the improved corrosion inhibiting effects provided by potassium monofluorophosphate are illustrated by reference to the accompanying drawings in which:

FIG. 1 is a photograph illustrating the corrosion inhibiting effects of potassium monofluorophosphate;

FIG. 2 is a photograph illustrating, for comparison purposes, the corrosion inhibiting effects of sodium monofluorophosphate employed in the same condition as for potassium monofluorophosphate in FIG. 1; and FIG. 3 illustrates the penetration of different monofluorophosphates in concrete.

EXAMPLES

Example 1

Action in Alkaline Environment

Solutions were prepared with addition of sodium hydroxide to either distilled water or tap water (containing calcium), in order to obtain a pH of about 13, simulating the environment of an uncarbonated concrete. 0.5 M of sodium chloride was added to simulate the corrosive environment of concrete contaminated by deicing salts. 2 ml portions of the solutions were used in standard plastic tissue culture test plates with 24 positions. Various amounts of potassium monofluorophosphate and sodium monofluorophosphate were added to each cell and a nail was immersed in the different solutions and visually observed for the development of pitting corrosion, which usually happens in such a case, during 30 days. Nails were cleaned in ethyl alcohol with 1% nitric acid added, then rinsed five times in distilled water and transferred directly from distilled water to test solution.

After cleaning the nails and observing them under a magnifying glass, it appears that sodium chloride in that environment yields the formation of corrosion pits, without the development of a general rust on the nail surface. Potassium monofluorophosphate offers a better protection than sodium monofluorophosphate at the 0.1 M concentration: no pits were visible whereas with sodium monofluorophosphate, slight pitting could be observed. At 0.5 M, there was no corrosion for either inhibitor.

Example 2

Action in Neutral Environment

This is intended to simulate the chemical environment of carbonated concrete. Tap water was used, because it contains calcium ions which are also present in concrete and play an active role in the corrosion process.

In some of the solutions, 0.5 M NaCl was added to simulate carbonated concrete polluted by deicing salts.

Various quantities of sodium monofluorophosphate and potassium monofluorophosphate were also added. The development of the corrosion of nails immersed for thirty days in these solutions was visually observed. The preparation of the solutions and nails is similar to Example 1.

The photographs of FIGS. 1 and 2 show that a general type of corrosion typical of neutral environments starts developing after only a few hours. The effect of chlorides is in this case secondary. Inhibitors are efficient at a lower concentration than in alkaline media. Potassium monofluoro-phosphate is clearly more efficient as a corrosion inhibitor than sodium monofluorophosphate: it offers at a concentration of 0.01 M about the same protection as is provided by sodium monofluorophosphate at a concentration of 0.05 M. In other words potassium monofluorophosphate is five times more effective as a corrosion inhibitor, than sodium monofluorophosphate.

In the photographs of FIGS. 1 and 2, the corrosion results in a darkening of the nails. The pale coloured nails are the result of effective corrosion inhibition.

Example 3

Concrete Penetration Tests

Concrete slabs having the dimensions 15×15×2 cm were immersed at one end during 12 hours respectively into 20% aqueous solutions of:
  sodium monofluorophosphate
  potassium monofluorophosphate
  ammonium monofluorophosphate
  Tris monofluorophosphate.

Tests with the known inhibitor sodium monofluorophosphate were redone a second time to ensure representativity.

Concentration profiles of the monofluorophosphates were measured using ion chromatography to accurately quantify fluorophosphate ions only in that they constitute an active inhibitor part.

Results show that only sodium and potassium monofluorophosphates were able to penetrate significantly into concrete, performance of both products being similar. There is no significant difference between the penetrating performance of the two products.

It was, however, notable and perhaps unexpected that ammonium and tris monofluorophosphates did not penetrate the concrete as both of these products have a high solubility in water. It thus appears that the performance of monofluorophosphates into concrete may depend in a large measure on the cation present.

We claim:

1. A method of inhibiting corrosion in a reinforced concrete containing steel reinforcing members comprising:
    contacting the reinforced concrete with potassium monofluorophosphate.

2. A method according to claim 1, wherein said potassium monofluorophosphate is in an aqueous solution.

3. A method according to claim 2, which comprises contacting a surface of said reinforced concrete with said aqueous solution such that potassium monofluorophosphate in said solution penetrates into said reinforced concrete.

4. A method according to claim 2, wherein said solution contains up to 35%, by weight, potassium monofluorophosphate.

5. A method according to claim 3, wherein said solution contains up to 35%, by weight, potassium monofluorophosphate.

6. A method according to claim 4, wherein said solution contains from 5 to 20%, by weight, potassium monofluorophosphate.

7. A method according to claim 5, wherein said solution contains from 5 to 20%, by weight, potassium monofluorophosphate.

8. A reinforced concrete containing steel reinforcing members and having a concrete surface, said concrete containing potassium monofluorophosphate.

9. A reinforced concrete according to claim 8, wherein said potassium monofluorophosphate is present in a zone of the concrete extending inwardly of said concrete.

* * * * *